United States Patent [19]

Wills et al.

[11] Patent Number: 4,716,297

[45] Date of Patent: Dec. 29, 1987

[54] METHOD AND APPARATUS FOR OPTICALLY SWITCHING CURRENT

[75] Inventors: Harry D. Wills, Mentor, Ohio; Joseph L. Betthauser, San Jose, Calif.

[73] Assignee: General Electric Company, San Jose, Calif.

[21] Appl. No.: 743,001

[22] Filed: Jun. 10, 1985

[51] Int. Cl.$^4$ .............................................. G02B 27/00
[52] U.S. Cl. ........................................ 250/551; 455/602
[58] Field of Search ............... 250/551; 455/601, 602, 455/607, 610, 612; 361/191, 192, 193; 307/112, 116, 117, 125, 126, 139, 140

[56] References Cited

U.S. PATENT DOCUMENTS

| | | | |
|---|---|---|---|
| 3,541,341 | 11/1970 | Leete | 250/551 |
| 3,886,544 | 5/1975 | Narodny | 340/365 |
| 3,931,514 | 1/1976 | Patterson | 250/206 |
| 4,088,387 | 5/1978 | Lewis | 350/96.15 |
| 4,153,860 | 5/1979 | Vonick | 315/155 |
| 4,181,901 | 1/1980 | Heyke | 331/94.5 |
| 4,193,662 | 3/1980 | Hara | 350/96.15 |
| 4,261,638 | 4/1981 | Wagner | 350/96.15 |
| 4,282,604 | 8/1981 | Jefferson | 455/602 |
| 4,318,006 | 3/1982 | Himeno et al. | 361/193 |
| 4,401,365 | 8/1983 | Mizokawa et al. | 350/96.20 |
| 4,420,841 | 12/1983 | Dudash | 455/607 |
| 4,441,785 | 4/1984 | Petrozello | 350/96.20 |
| 4,456,828 | 6/1984 | Mason et al. | 250/551 |
| 4,470,662 | 9/1984 | Mumzhiu | 350/96.15 |
| 4,565,924 | 1/1986 | Misumi et al. | 250/551 X |
| 4,588,896 | 5/1986 | Abbas | 250/551 X |
| 4,612,445 | 9/1986 | Neri | 250/551 |

*Primary Examiner*—William L. Sikes
*Assistant Examiner*—Frank Gonzälez
*Attorney, Agent, or Firm*—R. R. Schroeder; Raymond G. Simkins

[57] ABSTRACT

An electrical switching system comprising a relay having a photoelectric element comprising a photodiode, with first and second electrodes and a photosensitive portion. The photosensitive portion is responsive to optical stimulation for electrically coupling the first and second electrodes, permitting transmission of electrical current between them whereby the relay can be connected to a source of electrical power. The electrical switching system comprises a pair of such relays which cooperate through optical signals to operate the switch system. Also a part of the switching system is an optical rotary switch for controlling the operation of the switch system. A further aspect of the disclosed invention comprises a nuclear power generating apparatus including a monitoring arrangement operated by the electrical switching system of this invention.

17 Claims, 22 Drawing Figures

METHOD AND APPARATUS FOR OPTICALLY SWITCHING CURRENT

BACKGROUND OF THE INVENTION

This invention relates generally to the field of optical switches, and more specifically to systems for effecting a change in electrical current through the use of optically transmitted signals.

Regulations in the nuclear power industry require nuclear power plants to be built with four redundant divisions of safety equipment to monitor each parameter of plant operation, such as core temperature and coolant level. That is, for a given safety function, such as maintaining proper reactor core temperature, each of the plant's four safety divisions must independently sense the core temperature and determine whether it is within an acceptable temperature range. Thus, should a failure occur in as many as three of the four redundant safety divisions, an unsafe plant condition will still be detected by the remaining safety division, which will then take appropriate emergency measures.

A nuclear power plant operates in one of four basic modes: RUN, START UP/HOT STANDBY, REFUEL, and SHUTDOWN. Each of these modes must be monitored according to a different set of safety parameters, which must be simultaneously and independently monitored by each of the four safety divisions. It is therefore necessary for a single switch to simultaneously signal each of the four safety divisions when the plant is being changed to a new mode of operation, so that the safety parameters pertinent to the new mode can be monitored.

In order to assure that at least one of the redundant safety divisions will always be operational, nuclear safety regulations further require that each safety division be capable of operating independently of the others, so that no two safety divisions rely on a common sensor, electrical cable or circuit board. In addition to maintaining separate and independent components, the safety divisions must be electrically isolated from each other, so that no electrical components or connections from one safety division are located within 6 inches from those of another safety division. These requirements pose particular design problems at the mode selector switch of the reactor control panel, where all four safety divisions must meet to determine the present mode of plant operation so that corresponding safety procedures can be put into effect.

Prior to the present invention, control panels for nuclear reactors have utilized a manually operated 270° rotary switch to select one of the four modes of plant operation. As this switch is rotated from one mode to the next, a rotary shaft communicates the switch position to each of the four divisions of safety circuits, which are spaced along the shaft at intervals of 6 inches or more in order to provide adequate electrical isolation. This results in a rotary shaft over 18 inches long, which causes substantial problems resulting from tortional flexion and takes up a great deal of space in the control panel.

In order for the mode switch to work properly, it is essential that all four safety divisions be switched simultaneously when changing from one mode to the next. However, the use of a long rotary shaft in conventional rotary switches results in a high degree of twist along its length when the switch knob is turned, which can cause the safety division associated with the front end of the shaft to switch to the new mode before the other safety divisions. Such flexion may, for example, cause one of the safety divisions to be in the RUN mode while the remaining safety divisions are in the START UP mode, circumventing the redundancy which was intended to be an essential part of the safety system. Other disadvantages of the conventional switching arrangement are high space requirements behind the control panel needed to house the switch, high cost of construction, and frequent maintenance to clean the switch contacts and/or replace worn out mechanical parts.

The present invention uses optical data transmission to provide a method and apparatus which is particularly useful for switching electrical current in the safety divisions of a nuclear plant. It is compact, highly reliable, and provides effective electrical isolation of the safety divisions at their closest point of congregation, thus minimizing the possibility of short circuiting, electrical fires and other malfunctions.

It is therefore an object of the present invention to overcome the above-described problems of mechanical rotary switches, particularly those used to switch the safety divisions of a nuclear plant to a desired operational mode.

It is a particular object of this invention to provide a switching system which may be used in place of a mechanical rotary switch to eliminate the adverse effects of tortional flexion of the rotary shaft.

It is a further object to provide such a switching system in which all contacts associated with a particular switch position are simultaneously made.

It is another object to provide a compact switch which maintains a high degree of electrical isolation among the circuits connected to it, and specifically to provide such a compact switch which satisfies the electrical isolation requirements of safety regulations in the nuclear industry.

It is yet another object of the present invention to provide a switching system which is inexpensive to build and may be operated for long periods of time without maintenance.

SUMMARY OF THE INVENTION

In accordance with one aspect of the invention, a relay is provided which comprises a photoelectric element, such as a photodiode, having first and second electrodes and a photosensitive portion. The photosensitive portion is responsive to optical stimulation for electrically coupling the first and second electrodes, permitting transmission of electrical current between them. An electrical input terminal is electrically coupled to the first electrode, for connecting the relay to a source of electrical power. An optically opaque housing encases at least the photosensitive portion of the photoelectric element, and an optical input port is optically coupled to the photosensitive portion through this housing. The relay also comprises a light source, such as an LED, having first and second electrodes, responsive to electrical current through the electrodes for emitting light. An optical output port is optically coupled to the light source, permitting an optical signal from the light source to be sent to an external device or fed back to the photoelectric element. The second electrode of the photoelectric element is electrically coupled to the first electrode of the light source, and to a second electrical terminal for connecting the relay to an electrical load. A third electrical terminal is electrically coupled to the second electrode of the light source, for permitting some of the current through the photoelectric element to energize the light source.

In another aspect of the invention, an electrical switching system is provided which uses a light signal from a first relay to trigger a second relay. This system is particularly useful for performing a mode switching operation in a nuclear power plant, wherein both relays are used in the same safety division and each supplies electrical power to the safety circuitry of a different mode. The first and second relays each have a first electrical terminal for connection to a source of electrical power, and a second electrical terminal for connection to an electrical load. The first relay is designed to electrically couple its first and second terminals in response to a first signal, and comprises an element, such as an LED, for emitting light in response to the electrical coupling in its first and second electrical terminals. The second relay comprises a device such as a photodiode for electrically coupling its first and second electrical terminals in response to an optical signal from the light emitting device of the first relay. The switching system further comprises an apparatus for optically coupling the light emitting device of the first relay to the electrical coupling device of the second relay, so that the second relay may be optically triggered with light from the first relay.

In another aspect of the invention an optical rotary switch is provided, which may be used in cooperation with the above-described relay and switching system. The rotary switch comprises a switch base with an assembly rotatably mounted thereon for optically coupling portions of the base. A first optical exciter port and a first optical indicator port are disposed on the base, for communication of optical signals. A second optical exciter port and a second optical indicator port are also disposed on the base, spaced from the first optical exciter and indicator ports. The spacing between the ports is arranged so as to permit the rotatable assembly to optically couple all of the ports in a first rotational position and to optically couple only the first ports or the second ports in other rotational positions.

Another aspect of the present invention provides a method for selectively switching power to first and second electrical loads. This method uses first and second relays substantially similar to those described in the switching system above, in combination with signal generating and optical coupling steps which enable the first relay to energize the second relay.

Yet another aspect of the invention provides a nuclear power generating apparatus having a power generating portion which generates electricity in response to controlled burning of a nuclear fuel. A plurality of redundant divisions of safety circuitry simultaneously monitor an operating condition of the generating portion. The safety divisions are electrically and physically isolated from each other, in accordance with nuclear industry regulations. Each safety division has an electrical power source, a load adapted to monitor the operating condition of the generating portion when the power source is electrically coupled to it, and a relay for electrically coupling the load and power source in response to an optical signal. In addition, each safety division has its current carrying elements physically separated from those of each other safety division by more than a specified distance, such as the 6" distance presently mandated by the regulations. A plurality of optical waveguides, which are physically separated from each other by less than the specified distance, couple each of the relays to a single location. A device is provided for simultaneously inputting the optical signal to the plurality of waveguides at the single location, so that the safety divisions may be simultaneously activated.

DESCRIPTION OF THE PREFERRED EMBODIMENT

Figure 1:
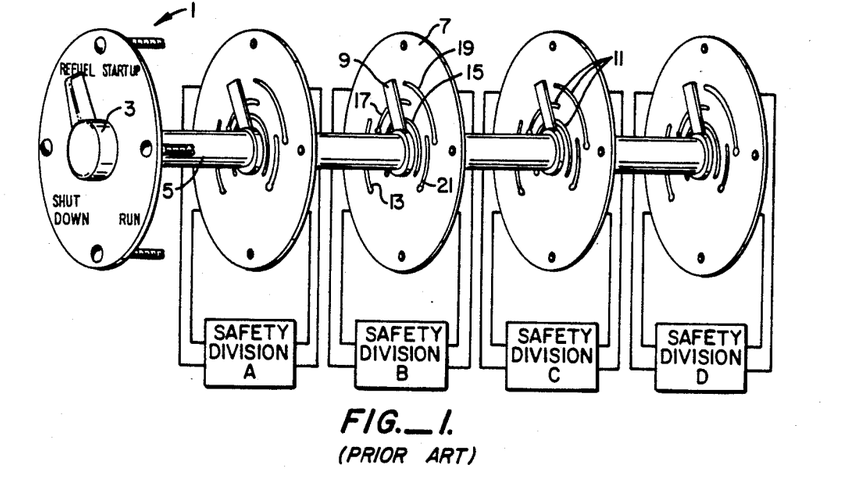
FIG. 1 is a perspective view of a conventional mode switch in a nuclear reactor.

FIG. 1 illustrates a conventional mechanical rotary switch 1 similar in function to those used in nuclear power plants. The switch 1 comprises a knob 3 attached to a rotary shaft 5 which rotates through a 270° arc to activate one of the four modes of plant operation: RUN, START UP/HOT STANDBY, REFUEL, and SHUTDOWN. Four contact discs 7 spaced along the length of the rotary shaft 5 are each electrically connected to one of four redundant divisions (A through D) of safety circuitry used to monitor the control functions of the plant and to take appropriate action, such as initiating an alarm, when the monitored function falls outside of a preferred operational range. A sweeper arm 9 fixed to rotary shaft 5 sweeps about the face of each contact disc 7, electrically connecting a pair of contacts, collectively referenced as 11, at each of the four rotational positions of the switch, to activate the safety circuitry of the corresponding mode to which knob 3 is turned.

When the nuclear plant is in the SHUTDOWN mode, the sweeper arm 9 of each contact disc 7 connects shutdown contact 13 to a common contact 15. As switch knob 3 is rotated from SHUTDOWN to REFUEL, sweeper arms 9 move along shutdown contact 13 to a point where they make connection between refuel contact 17 and common contact 15 while maintaining their connection to the shutdown contact. As knob 3 approaches the REFUEL position, sweeper arms 9 break connection with shutdown contact 13, leaving only refuel contact 17 connected to the common contact 15 of each plate.

Accordingly, a "make before break" function is established in which each safety division activates the circuitry of the new mode before breaking connection with the safety circuitry of the old mode. Similarly, as knob 3 is rotated from REFUEL to START UP and from START UP to RUN, sweeper arms 9 make connection with start up contacts 19 before breaking connection with refuel contacts 17, and make connection with run contacts 21 before breaking connections with start up contacts 19.

Regulations in the nuclear industry require each safety division of a nuclear plant to be electrically isolated by at least 6 inches from current carrying elements of every other safety division. Since all four safety divisions must congregate at a single mode switch to effect simultaneous switching, the four contact discs 7 of a conventional rotary switch must be spaced at least 6 inches apart along the rotary shaft 5, resulting in a shaft length of over 18 inches. However, tortional stresses along the rotary shaft can cause it to twist, resulting in nonsimultaneous switching among the four safety divisions and creating a situation in which the intended redundancy of the safety system is defeated.

Figure 2:
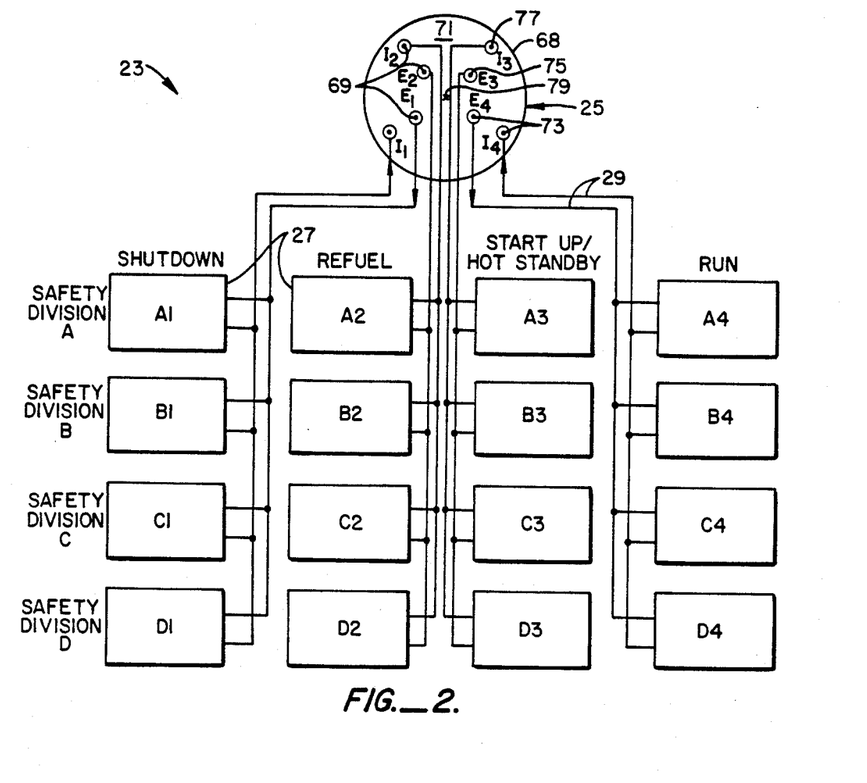
FIG. 2 is a schematic representation of a switching system according to the present invention.

FIG. 2 is a schematic representation of a switching system 23 according to the present invention, in which an optical switch 25 is coupled to a group of electro-optic relays 27 by optical wave guides, such as optic fibers 29. As used in this specification and the appended claims, the terms "light" and "optical" refer to both visible and invisible electromagnetic radiation, consonant with the properties of the materials used in a particular embodiment of the invention. Radiation outside of the visible range of the spectrum, such as ultra-violet or infrared, may be used in applications where visible feedback to a human operator is not required.

The horizontal rows of relays 27 in FIG. 2 are each associated with one of safety divisions A, B, C, and D, and the vertical columns of relays 27 each correspond to a particular mode of plant operation. For example, the four relays of safety division A are labeled A1, A2, A3 and A4, and are disposed in a horizontal row. The four relays of the SHUTDOWN mode are labeled A1, B1, C1, D1, and are disposed in a vertical column. It will thus be understood that the SHUTDOWN relay in safety division A is located at the intersection of the A row and the SHUTDOWN column, and is labeled A1.

Figure 3A:
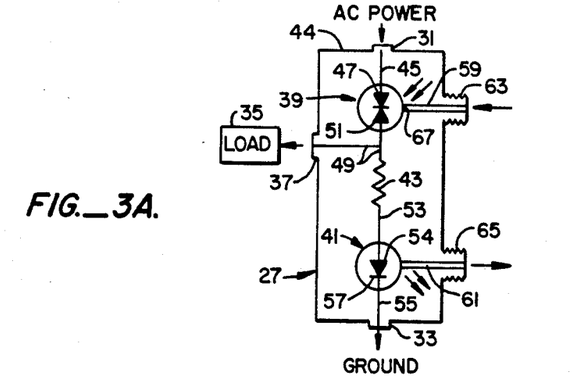
FIG. 3A is a schematic view of an electro-optic relay used in the switching system of FIG. 2.

FIG. 3A is a schematic representation of one of the electro-optic relays 27, showing its electrical and optical connections and circuit elements. Relay 27 is used to switch AC power applied across electrical input terminal 31 and grounding terminal 33 to an electrical load 35 at an electrical output terminal 37. A photoelectric element, such as photodiode 39, is electrically coupled to input and output terminals 31 and 37, and to a light source, such as LED 41, through resistor 43. An optically opaque housing 44 encases photodiode 39, optically isolating the photodiode from LED 41 and from light outside the housing.

Lead 45 connects one electrode 47 of photodiode 39 to electrical input terminal 31, and a second lead 49 connects the second electrode 51 of photodiode 39 to electrical output terminal 37 and to one end of resistor 43. Lead 53 connects the other end of resistor 43 to a first electrode 54 of LED 41 and another lead 55 connects the second LED electrode 57 to electrical grounding terminal 33. Optical wave guides, such as optical fibers 59 and 61, respectively, extend through optically opaque housing 44 to optically couple photodiode 39 to a threaded optical input port 63 and to optically couple LED 41 to a threaded optical output port 65.

Figure 3B:
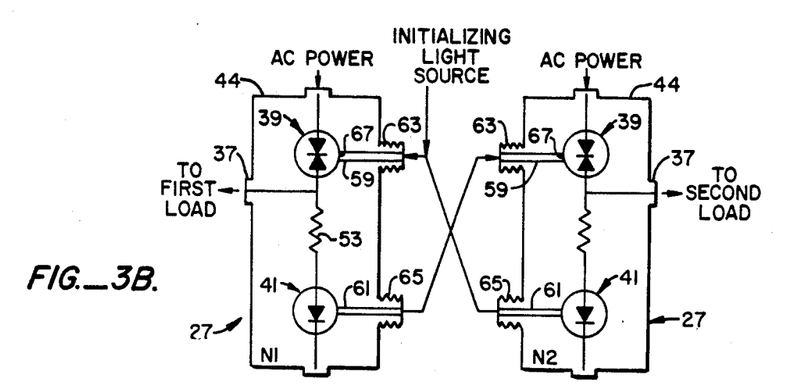
FIG. 3B is a schematic representation illustrating the cooperation of two associated electro-optic relays.

FIG. 3B illustrates the basic building block of the optical switching system 23 of FIG. 2, in which two relays 27, respectively labeled N1 and N2 and connected to first and second electrical loads, may optically trigger each other to switch AC power to their respective loads. An initializing light source is optically coupled to input port 63 of relay N1, as by an optical fiber, to initially energize relay N1 to an "on" state. Light from the initializing light source is optically coupled to the photosensitive region 67 of photodiode 39, causing it to electrically couple its first and second electrodes 47 and 51, and thereby provide AC power to the first load at electrical output terminal 37. At the same time, AC voltage is applied across the electrodes of LED 41 through resistor 53, which has a sufficiently high resistance to minimize power drain through the LED. Light emanating from LED 41 of relay N1 is optically coupled to optical output port 65, from which it may be transmitted to remote locations. Some of the light from LED 41 may also be fed back to photodiode 39 of relay N1 to lock that relay in the "on" state, as discussed in greater detail below.

When relay N2 is to be turned on, an optical fiber or other wave guide may be used to couple the light from optical output port 65 of relay N1 to the optical input port 63 of relay N2. This light is coupled by optic fiber 59 to the photodiode 39 of N2, which switches AC power to the second load and turns on its associated LED 41. The light from that LED is optically coupled by optic fiber 61 to optical output port 65 of N2, for transmission to remote locations. Again, some of the light from LED 41 of relay N2 may be fed back to its associated photodiode 39 to lock that relay in the "on" state.

After the light from output port 65 of N1 is used to turn on relay N2, N1 may be switched off so as to decouple the first load from its source of AC power. Relay N1 may then be energized a second time by coupling the light from output port 65 of N2 to the input port 63 of N1, causing the photodiode 39 of N1 to couple AC power to the first load.

As seen in FIG. 2, optical switch 25 comprises a disc shaped base 68 having eight optical ports 69 disposed about its front face 71 in four corresponding pairs 73. Each port 69 comprises an optical terminating point on switch face 71 for one of optic fibers 29, providing a source of optical input or output for the column of relays 27 to which that optic fiber is coupled. Each pair 73 of corresponding ports comprises an exciter (E) and indicator (I) port, 75 and 77, disposed on a radial line through a central point 79 of switch face 71, all E ports and all I ports lying respectively on inner and outer concentric circles. The four radial pairs 73 are spaced apart in three equal arcs of 80°, with a 120° arc separating ports E1 and I1 from ports E4 and I4.

Each radial pair 73 of exciter and indicator ports exchange optical information with a corresponding column of relays 27 representing one of the four modes of plant operation. Thus, each such pair represents a different switch position corresponding to either the SHUTDOWN mode (I1, E1), REFUEL (I2, E2), START UP (I3, E3), or RUN (I4, E4) modes. A radial pair 73 of optical ports is coupled to the four relays 27 of its corresponding mode by optical fibers 29, with exciter port 75 coupled to the optical input ports 63 of its corresponding relays 27 and indicator port 77 coupled to the optical output ports 65 of the relays.

When the system 23 is first installed, an initializing key 81 (FIG. 4) is used to perform an initializing operation in which the four relays 27 of the SHUTDOWN mode are switched to the "on" state. Key 81 comprises a housing 83 having a cylindrical projection 85 adapted to mate with exciter port E1. LED 87 is mounted inside projection 85, and is connected in series with a battery 89 and resistor 91 across the contacts 93 of push button switch 95.

Figure 4:
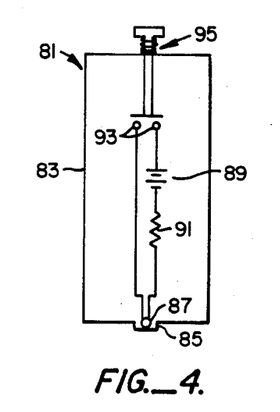
FIG. 4 is a schematic representation of a device used to initialize the relays of the switching system of FIG. 2.

To initialize switching system 23, an operator inserts projection 85 of initializing key 81 into port E1 and presses push button switch 95. Light from LED 87 is coupled from port E1 to the optical input ports 63 of SHUTDOWN relays A1 to D1 by one of optic fibers 29, triggering their respective photodiodes 39 to provide AC power to associated loads 35 and LEDs 41.

FIGS. 5-8 illustrate a first embodiment of the present invention, used in conjunction with the switching system 23 of FIG. 2. After the initializing operation discussed above has been performed, light from LED 41 of each SHUTDOWN relay is fed back to its associated photodiode 39 by optical fiber 97 to lock these relays in the "on" state. Optical fibers 29 and 97 are optically coupled to input and output ports 63 and 65 by threaded couplings 99, which permit rapid assembly and disassembly of the optical junctions.

Figure 6:
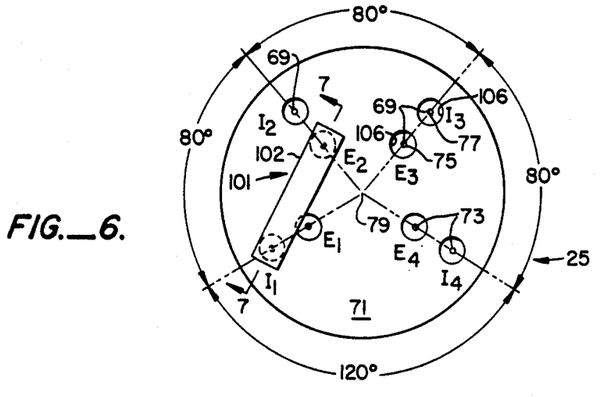
FIG. 6 is a plan view of an optical switch according to a first embodiment of this invention.
Figure 7:
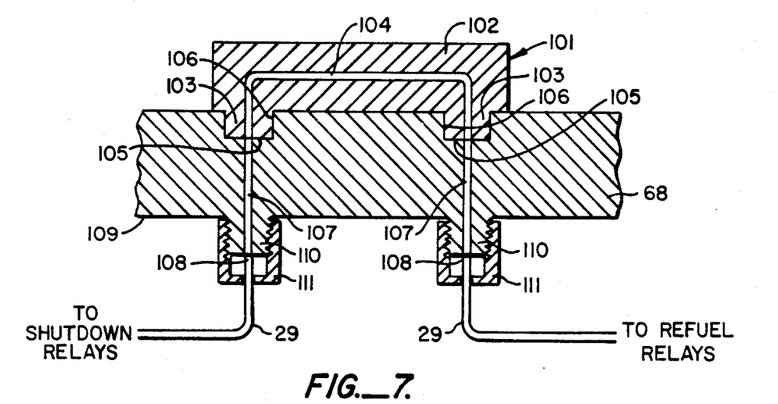
FIG. 7 is a sectional view along line 7—7 of FIG. 6.

Mode switching in the first embodiment is accomplished with a switching key 101, as seen in FIGS. 6 and 7 which illustrate a switching operation from the SHUTDOWN mode to the REFUEL mode. Switching key 101 comprises an elongate rectangular block 102 having two spaced apart cylindrical projections 103 extending downwardly from the base of the block, and an optical wave guide or fiber 104 extending between the ends 105 of the two projections 103. The depth and diameter of each projection 103 are selected for mating engagement with cylindrical cavities 106 of exciter and indicator ports 75 and 77, and the distance between projections 103 is equal to the distance between the exciter and indicator ports of adjacent radial pairs 73 separated by an 80° arc, such as radial pairs E1, I1 and E2, I2 of the SHUTDOWN and REFUEL modes.

Optical waveguides or fibers 107 extend through optical switch base 68, coupling each optical port 69 on switch face 71 to a corresponding optical port 108 on the back face 109 of switch 25. Optical ports 108 each comprise a threaded projection 110 for securing threaded coupling 111 of a corresponding optic fiber 29, providing continuous optical coupling from ports 69 to relays 27. Switching key 101 may thus be used to couple light from the LEDs 41 of an energized column of relays 27 to the photodiodes 39 of a deenergized column of relays 27, to initiate a switching operation as discussed below.

Figure 8:
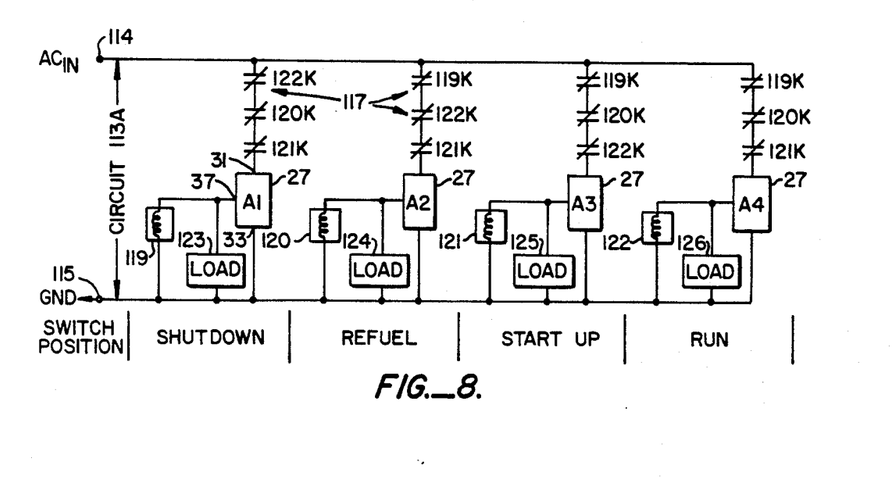
FIG. 8 is a schematic representation of an electrical circuit used in the first embodiment.

FIG. 8 illustrates an electrical circuit 113 used in each of the safety divisions of the first embodiment to turn off a previously energized relay 27 after a mode switching operation has been performed. In order to assure continuity of protection among the safety divisions of a nuclear plant, mode switches must be designed so that, as the plant changes from one mode to the next, the electrical connections of the new mode are made before those of the former mode are broken. The first embodiment controls this "make before break" function electrically via four electrical circuits 113. While FIG. 8 illustrates circuit 113A with respect to relays A1-A4 of safety division A, it will be understood that corresponding circuits 113B, 113C and 113D are respectively provided in safety divisions B, C and D to control their associated sets of relays 27.

AC power provided at the terminals 114, 115 of circuit 113A is supplied to each of relays A1 through A4, after passing through three serially connected pairs of relay contacts 117 which are controlled by conventional electrical relays 119-122. Electrical relays 119-122 are respectively connected across the electrical output and grounding terminals 37, 33 of electro-optic relays A1, A2, A3 and A4, and electrical loads 123-126 are respectively connected in parallel with relays 119-122. The normally closed contacts 117 of each electrical relay 119-122, respectively identified as 119K-122K, are connected in series with all but their corresponding electro-optic relay 27. For example, normally closed contacts 119K of electrical relay 119 are connected in series with optical relays A2, A3 and A4, but not with their corresponding electro-optic relay A1. Accordingly, when photodiode 39 of relay A1 is triggered, electrical relay 119 is energized, opening contacts 119K and turning off any of the electro-optic relays A2, A3, and A4 that had previously been on. Electrical relays 119-122 are designed to open their respective contacts 119K-122K, approximately one-half second after energizing. After approximately two seconds the relay contacts again close, and then remain closed during continued energization and subsequent deenergization.

After the initializing operation discussed above, switching operations with the first embodiment may be performed as follows. To switch from the SHUTDOWN mode to the REFUEL mode, the operator inserts switching key 101 into indicator port I1 and exciter port E2, coupling the light from SHUTDOWN relays A1-D1 to the REFUEL relays A2-D2 and turning them on. Light from LED 41 of each REFUEL relay is immediately fed back to photodiode 39 to lock on each of the REFUEL relays, permitting the operator to remove switching key 101 from the face 71 of optical switch 25. AC power is now delivered to electrical relays 120 and loads 124 at the electrical output terminals 37 of REFUEL relays A2-D2.

Approximately one-half second later, relay contacts 120K in the power circuits of relays A1-D1, A3-D3 and A4-D4 are opened, isolating those relays from the AC power at circuit terminals 114 and 115. This causes LEDs 41 in SHUTDOWN relays A1-D1 to turn off, breaking the optical feedback loop from LED 41 to photodiode 39 in each of these relays and causing them to deenergize. When relay contacts 120K open approximately two seconds later, restoring power to the electrical input terminals 31 of relays A1-D1, A3-D3 and A4-D4, these relays are again ready to be energized by coupling an optical signal to their respective optical inputs 63. Meanwhile, the switching system 23 will remain locked in the REFUEL mode, coupling AC power to loads 124 of REFUEL relays A2-D2.

It will be appreciated that a similar operation will permit an operator to switch sequentially from the REFUEL mode to the START-UP and RUN modes, then back through the START-UP, REFUEL and SHUTDOWN modes using switching key 101. It should be noted that, because of the arrangement of the exciter and indicator ports 75 and 77 on optical switch 25, switching key 101 will not permit a connection to be made other than in a sequential manner from one mode to the next, as with a mechanical rotary switch. Furthermore, the optical ports E1, I1 and E4, I4 of the SHUTDOWN and RUN modes are disposed so that an optical connection may not be made from one to the other, thus requiring the operator to take the power plant sequentially through the intermediary REFUEL and START-UP modes.

FIGS. 9 through 12 illustrate a second embodiment of the present invention, in which the "make before break" feature of the switching system is performed without electrical relays 119–122 of the first embodiment. In the second embodiment, the optical input and output ports 63 and 65 of each optical relay 27 (FIG. 3A) are respectively coupled by optical fibers 29 to its associated exciter and indicator ports 75 and 77, without the feedback provided by optical fiber 97 of the first embodiment. Instead, an optical bridge 127 is provided for optically coupling any of the radial pairs 73 of exciter and indicator ports 75, 77 on the face 71 of optical switch 25.

Figure 9:
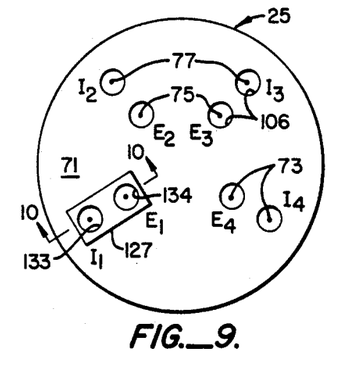
FIG. 9 is a plan view of an optical switch according to a second embodiment of the invention.

FIG. 9 illustrates switch 25 with optical bridge 127 coupling ports E1 and I1 of the SHUTDOWN mode. As seen in the cross sectional view of FIG. 10, optical bridge 127 comprises a rectangular block 129 having two spaced apart cylindrical projections 131, 132 extending downwardly from the base of the block so as to interchangeably mate with the two cylindrical cavities 106 of each radial pair 73 of exciter and indicator ports 75, 77 on optical switch 25. An upper pair of cylindrical cavities 133, 134 are provided in optical bridge 127 directly above the lower pair of cylindrical projections 131, 132, and having the same dimensions as the cylindrical cavities 106 of the exciter and indicator ports 75, 77. Optical waveguides such as optic fibers 136–138 extend respectively from lower projection 131 to upper cavity 133, from lower projection 132 to upper cavity 134, and from lower projection 131 to lower projection 132.

Figure 10:
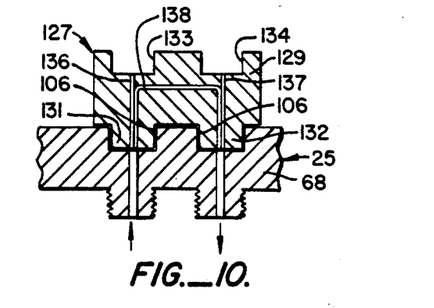
FIG. 10 is a cross-sectional view along line 10—10 of FIG. 9, illustrating the construction of an optical bridge.

When optical bridge 127 is mated with ports I1 and E1 of the SHUTDOWN mode, as in FIG. 10, light which is transmitted to indicator port I1 from SHUTDOWN relays A1 through D1 is coupled back to exciter port E1 by the optical bridge, and is then transmitted to photodiodes 39 of the SHUTDOWN relays, creating an optical feedback loop which maintains those relays in the SHUTDOWN mode as long as optical bridge 127 is left in position. At the same time, light from indicator port I1 is transmitted through optic fiber 136 to the base of upper cavity 133, providing an external indication of the energization of the SHUTDOWN relays.

Initialization of the switching system 23 of this embodiment is performed with an optical bridge 127 and an initializing key 81 as in FIG. 4. The optical bridge 127 is mated with ports E1 and I1 of the SHUTDOWN mode, as seen in FIG. 9. Initializing key 81 is mated with upper cavity 134 of the optical bridge, which is optically coupled to exciter port E1 below it. LED 87 of the initializing key is then turned on, illuminating photodiodes 39 of SHUTDOWN relays A1–D1, which pass current to their associated LEDs 41, turning them on. Light from these LEDs is then transmitted to optical switch 25 and coupled back to relays A1–D1 through optical bridge 127, so that the initializing key 81 may be removed. Optical bridge 127 then remains in place until the operator switches to the next mode.

Figure 11:
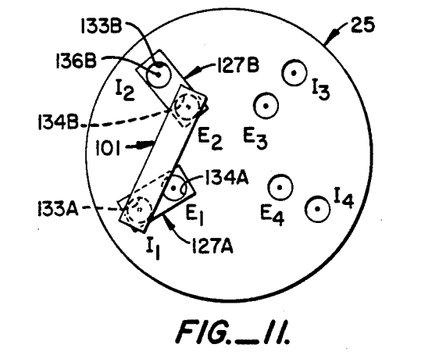
FIG. 11 is a plan view of the optical switch of FIG. 9 in the process of changing from one mode to the next.
Figure 12:
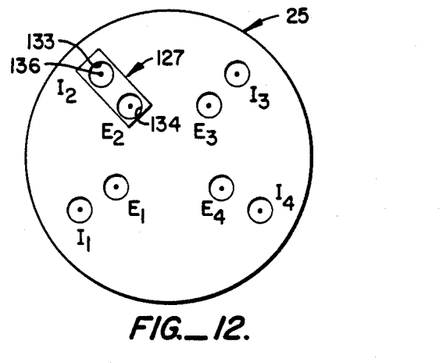
FIG. 12 is a plan view of the optical switch of FIG. 9 in the next adjoining switch position.

A change from one mode to the next is accomplished with a switching key 101, as described above with respect to the first embodiment, and two optical bridges 127A and 127B. The sequence of a switching operation in the second embodiment is shown in FIGS. 9, 11 and 12, which illustrate a change from the SHUTDOWN mode to the REFUEL mode. When the switching system 23 is in the SHUTDOWN mode, as in FIG. 9, the first optical bridge 127A couples exciter and indicator ports E1 and I1, completing the optical feedback loop which keeps SHUTDOWN relays A1–D1 energized. At the same time, light from the LEDs 41 of these relays is visible at the upper cylindrical cavity 133A of the first optical bridge 127A, which is optically coupled to the indicator port I1.

To switch to the REFUEL mode, the operator inserts a second optical bridge 127B in optical ports E2 and I2 of the REFUEL mode, and couples the light from port I1 to E2 by mating projections 103 of switching key 101 with upper cavities 133A and 134B of the two optical bridges. Light from LEDs 41 of relays A1–D1 is thus coupled to the photodiodes 39 of REFUEL relays A2–D2, energizing those relays and lighting their respective LEDs which lock them in the "on" state through the optical feedback provided by second optical bridge 127B.

The operator may now remove switching key 101 and, after confirming that the REFUEL relays have been energized by observing the light emitted from the upper end of optical fiber 136B in second optical bridge 127B, he may break the optical feedback circuit of SHUTDOWN relays A1–D1 by removing the first optical bridge 127A from optical switch 25. Accordingly, the "make before break" function discussed above with respect to the electrical circuit 113 of FIG. 8 is accomplished with a simple manual operation.

Figures 13, 14:
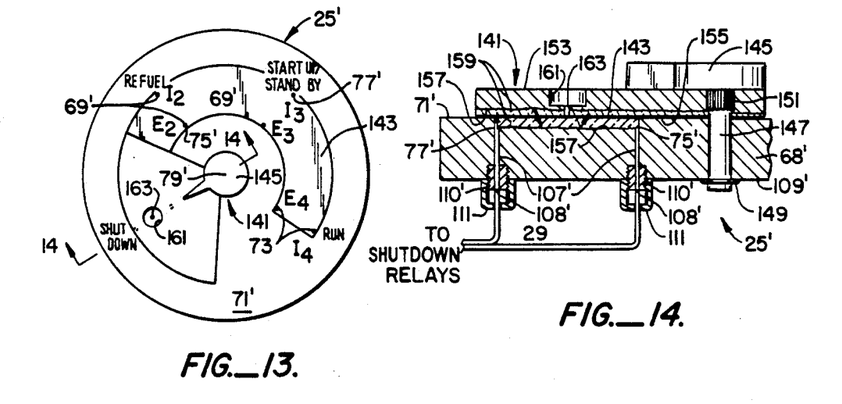
FIG. 13 is a plan view of a rotary optical switch according to a third embodiment of the invention.
FIG. 14 is a cross-sectional view of the switch of FIG. 13 taken along line 14—14.

FIGS. 13 through 15 illustrate a third embodiment of the present invention in which switching system 23 features a modified optical switch 25' with a rotating reflector assembly 141 which permits the switch to be operated in a manner similar to a conventional mechanical rotary switch. For purposes of this description, elements of modified switch 25' (third embodiment) which substantially correspond to elements of switch 25 (first and second embodiments) will be identified by priming the reference numbers of their corresponding elements.

In this embodiment, optical switch 25' again features eight optical ports 69' spaced about switch face 71' as in the first and second embodiments, each providing a source of optical input or output for a corresponding column of relays 27. In addition, a C-shaped reflective region 143 is provided on the front face 71' of the switch, contacting all ports 69' in a 240° arc starting with SHUTDOWN ports E1, I1 and proceeding in a counterclockwise direction to RUN ports E4, I4. Reflector assembly 141 is rotatably mounted over reflective region 143, providing optical feedback to relays 27 of the presently activated mode and optical switching from one mode to the next.

Reflector assembly 141 comprises an indicator knob 145 fixed to a shaft 147 which is rotatably mounted at the central point 79' of switch face 71', and held in place by circlip 149. A knurled portion 151 of shaft 147 holds a pie segment shaped vane 153 for rotation therewith. Vane 153 is formed with a reflective undersurface 155 which is held parallel to and in close proximity with switch face 71', and cooperates with reflective region 143 to couple light between the exciter and indicator ports 75', 77' covered by the vane.

The reflective surfaces 155 and 143 of vane 153 and switch face 71' are formed with a diffusive/reflective diamond-shaped pattern 157 pressed or cast into the respective surfaces, and coated with a highly reflective coating which scatters light energy from a lighted illuminator port 77'. A transparent layer of material 159 is provided over the diamond-shaped pattern 157 to protect it from abrasion as reflector assembly 141 is rotated.

Figure 5:
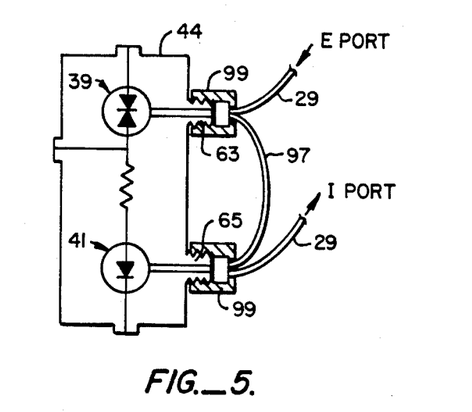
FIG. 5 is a schematic view of an electro-optic relay illustrating the optical feedback arrangement of the first embodiment.

A cylindrical initializing cavity 161 is provided in the upper surface of vane 153 to accept cylindrical projection 85 of the initializing key 81 of FIG. 5. A narrow passageway 163 extends from the base of cavity 161 through vane 153, permitting light from LED 87 of initializing key 81 to strike the portion of reflective region 143 under initializing cavity 161.

Optical waveguides or fibers 107' extend through optical switch base 68', coupling each optical port 69' on switch face 71' to a corresponding optical port 108' on the back face 109' of switch 25'. Optical ports 108' each comprise a threaded projection 110' for securing threaded coupling 111 of a corresponding optic fiber 29, providing continuous optical coupling from ports 69' to relays 27.

Figure 15A:
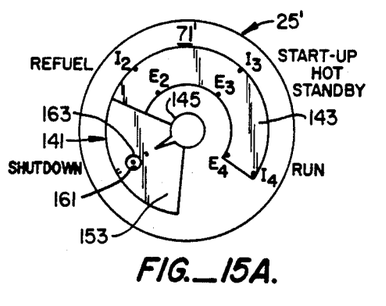
FIGS. 15A–G are a series of plan views of the rotary switch of FIG. 13, illustrating the switching sequence among the four modes of the optical switch.

The operation of the third embodiment will now be described with reference to FIGS. 15A through 15G, showing the sequence of switch positions from the SHUTDOWN mode through the RUN mode. In FIG. 15A, indicator knob 145 is pointed toward the SHUTDOWN position of optical switch 25', with vane 153 covering exciter and indicator ports E1 and I1. To initialize switching system 23, initializing key 81 is inserted in the mating cavity 161 of vane 153, and its LED 87 is illuminated by pressing pushbutton switch 95. Light from LED 87 travels through passageway 163 in the vane, and is reflected upwardly from reflective region 143 of switch face 71'. After striking the reflective undersurface 155 of vane 153, the light returns to reflective region 143 of the switch face, and is thereafter reflected between the two reflective surfaces 143 and 155 until it reaches exciter port E1. Light striking port E1 is transmitted by optical fibers 107' and 29 to the photodiodes 39 of SHUTDOWN relays A1-D1, energizing those relays and lighting their respective LEDs 41. Light from these LEDs is transmitted by optical fibers 29 and 107' back to indicator port I1 of optical switch 25', and is fed back to exciter port I1 by the two reflecting surfaces 143 and 155. The initializing key 81 may now be removed, and the optical feedback loop created by the opposed relation of reflecting surfaces 143, 155 maintains the SHUTDOWN relays in the "n" state.

Figure 15B:
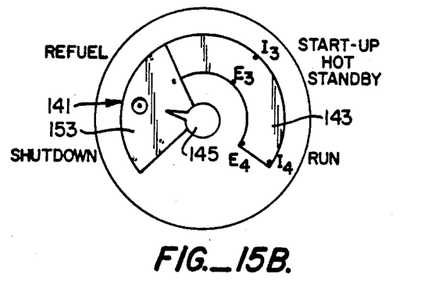
Figure 15C:
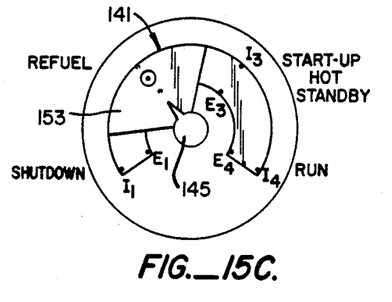

As seen in FIG. 15B, a change from the SHUTDOWN to the REFUEL mode is accomplished by rotating the indicator knob 145 clockwise so that vane 153 covers optical ports E1, I1, E2, and I2. Light from indicator port I1 is now transmitted to the three other ports covered by vane 153 through the cooperation of the reflective surfaces 143 and 155 which span these ports. Accordingly, while maintaining the feedback loop of the SHUTDOWN relays, the light from I1 is coupled to photodiodes 39 of REFUEL relays A2-D2, turning them on and creating a second optical feedback loop from the LEDs 41 of the refuel relays to indicator port I2, across reflective surfaces 143 and 155 and back to the REFUEL photodiodes 39 via exciter port E2. With reflector assembly 141 in this intermediate position, the REFUEL and SHUTDOWN relays are concurrently energized, to assure that the safety circuitry of the next (REFUEL) mode is activated before deactivating th safety circuitry of the previous (SHUTDOWN) mode. As the operator completes the rotation of indicator knob 145 to the REFUEL position, as seen in FIG. 15C, vane 153 moves out of alignment with ports E1 and I1, breaking the optical feedback loop between them and turning off the SHUTDOWN relays. Accordingly, the "make before break" feature of the first and second embodiments is accomplished through rotation of reflector assembly 141.

Figure 15D:
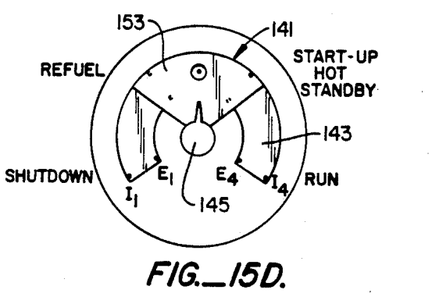
Figure 15E:
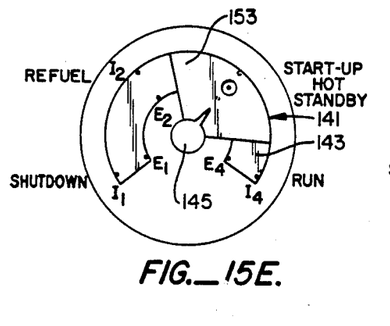

To switch from the REFUEL to the START-UP mode, the operator rotates the indicator knob 145 clockwise, moving vane 153 over indicator and exciter ports E2, I2, E3, and I3, as seen in FIG. 15D. Light from port I2 is transmitted to port E3 by reflective surfaces 143 and 155, turning on START-UP relays A3-D3 and creating another optical feedback loop between ports I3 and E3. As the rotation of knob 145 to the START-UP position of FIG. 13E is completed, vane 153 moves out of alignment with ports I2 and E2, breaking the optical feedback loop between them and turning off the REFUEL relays.

Figure 15F:
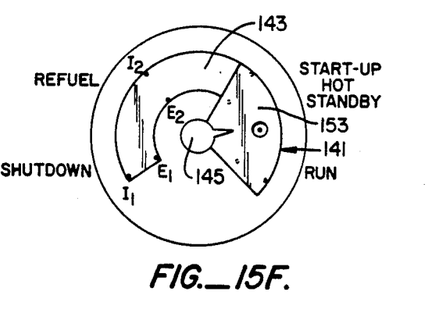
Figure 15G:
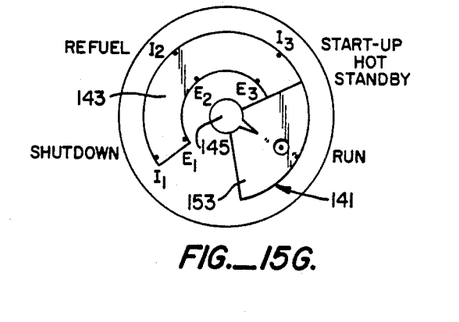

To switch from the START-UP mode to the RUN mode, the operator again turns indicator knob 145 clockwise to the position shown in FIG. 15F, in which ports I3, E3, I4, and E4 are covered by vane 153. Light from port I3 is coupled to port E4, turning on RUN relays A4-D4 and creating an optical feedback loop between ports I4 and E4 which maintains the RUN relays in the on state. As the operator completes the rotation of indicator knob 145 to the RUN position of FIG. 15G, vane 153 moves out of alignment with ports I3 and E3, breaking the feedback loop of the START-UP relays and turning them off.

It will be appreciated that the configuration of switch 25' does not permit the operator to mistakenly switch the system from the RUN mode directly to the SHUTDOWN mode or from the SHUTDOWN mode directly to the RUN mode, since the span of vane 153 is not sufficient to optically couple the ports of these two modes. As an additional precaution, C-shaped reflective region 143 of switch face 71' does not extend between the ports of these two modes, so the cooperative reflection between reflective surfaces 143 and 155 described above does not occur between these ports. The operator therefore must proceed back to the SHUTDOWN mode by turning indicator knob 145 in a counterclockwise direction, so that the system sequentially cycles from the RUN mode to the START-UP, REFUEL and SHUTDOWN modes.

From the above description it will be apparent that the subject matter of this invention is capable of taking various useful forms, and it is intended, therefore, that this disclosure be taken in an exemplary sense and that the scope of protection afforded be determined by the following claims.

We claim:

1. A relay, comprising:
   a photoelectric element having first and second electrodes and photosensitive means responsive to optical stimulation for electrically coupling said first and second electrodes so as to permit transmission of electrical current therebetween;

a first electrical terminal electrically coupled to said first electrode of said photoelectric element for connecting said relay to a source of electrical power;

an optically opaque housing encasing at least said photosensitive means of said photoelectric element;

an optical input port optically coupled to said photosensitive means defined through said optically opaque housing;

a light source having first and second electrodes, responsive to electrical current therebetween for emitting light;

an optical output port optically coupled to said light source;

said second electrode of said photoelectric element electrically coupled to a second electrical terminal and to said first electrode of said light source; and a third electrical terminal electrically coupled to said second electrode of said light source for permitting some of the current through said photoelectric element to energize said light source.

2. Electrical switching apparatus comprising:

first and second relays each having a first electrical terminal for connection to a source of electrical power and a second electrical terminal for connection to an electrical load;

said first relay comprising first means for electrically coupling its first and second terminals in response to a first signal, and means to emitting light in response to the electrical coupling of its first and second electrical terminals;

said second relay comprising second means for electrically coupling its first and second electrical terminals in response to an optical signal from said light emitting means of said first relay, comprises means for emitting light in response to the electrical coupling of its first and second electrical terminals, and further comprising means for optically coupling said light emitting means of said second relay to said first electrical coupling means; and means for optically coupling said light emitting means of said first relay to said second electrical coupling means.

3. Electrical switching apparatus according to claim 2, wherein said optical coupling means comprises:

an optical switch;

a first indicator port defined on said optical switch for providing a source of optical output for said first relay;

a first exciter port defined on said optical switch for providing a source of optical input for said second relay;

a first optical waveguide coupling said light emitting means to said first indicator port;

a second optical waveguide coupling said second electrical coupling means of said second relay to said first exciter port; and means for alternately making and breaking an optical coupling between said first indicator and first exciter ports of said optical switch.

4. Electrical switching apparatus according to claim 3 wherein said first electrical coupling means comprises means for electrically coupling said first and second terminals of said first relay in response to optical stimulation, and further comprising:

a second exciter port defined on said optical switch for providing a source of optical input for said first relay;

a third optical waveguide coupling said first electrical coupling means to said second exciter port; and means for alternately making and breaking an optical coupling between said first indicator port and said second exciter port, to control optical feedback between said first electrical coupling means and said light emitting means of said first relay.

5. Electrical switching apparatus according to claim 4 wherein said second relay comprises means for emitting light in response to the electrical coupling of its first and second electrical terminals, and further comprising:

a second indicator port defined on said optical switch for providing a source of optical output for said second relay;

a fourth optical waveguide coupling said light emitting means of said second relay to said second indicator port; and means for alternately making and breaking an optical coupling between said second indicator port and said first exciter port, to control optical feedback between said second electrical coupling means and said light emitting means of said second relay.

6. Electrical switching apparatus according to claim 5, wherein said means for optically coupling said first indicator and exciter ports further comprises means for optically coupling said second indicator and exciter ports.

7. Electrical switching apparatus according to claim 2 further comprising means for breaking the electrical coupling of said first relay after the coupling of said second relay's electrical terminals, said means being responsive to the optical coupling of said light emitting means to said second electrical coupling means by said optical coupling means.

8. A method for selectively switching power to first and second electrical loads, comprising:

providing a first relay responsive to a first signal for electrically coupling a first power source to the first electrical load and supplying power to a first light source illuminating same when said first source and first electrical load are electrically coupled;

providing a second relay responsive to a second signal for electrically coupling a second power source to the second electrical load, said second signal comprising an optical signal;

generating said first signal to energize said first relay; and optically coupling said first light source to said second relay to energize said second relay.

9. A method according to claim 8, further comprising breaking the electrical coupling between said first power source and the first electrical load after the coupling of said second power source to the second electrical load has been made.

10. A method according to claim 8 wherein said first signal comprises an optical signal, and said second relay is further responsive to said second signal for illuminating a second light source when said second power source and the second electrical load are coupled;

said method further comprising coupling said second light source to said first relay to reenergize said first relay.

11. A method as in claim 10 said method further comprising breaking said optical feedback from said first light source to said first relay after the coupling of said second power source to the second electrical load has been made.

12. A method according to claim 8 wherein said first signal comprises an optical signal, and said first relay decouples said first power source from the first electrical load in the absence of an optical signal, said method further comprising feeding back light from said first light source to said first relay to maintain the energization of said first relay after said first signal is withdrawn.

13. A method as in claim 12 wherein said second relay decouples said second power source from said second electrical load in the absence of an optical signal, said method further comprising feeding back light from said second light source to said second relay to maintain the energization of said second relay after said second signal is withdrawn.

14. A method as in claim 13 wherein said method further comprises providing an optical switch having:
   a first indicator port optically coupled to said first relay for outputting light from said first light source and a first exciter port optically coupled to said first relay for inputting light thereto;
   a second indicator port optically coupled to said second relay for outputting light from said second light source, and a second exciter port optically coupled to said second relay for inputting light thereto;
   a first optical bridge having first and second portions adapted to mate respectively with said first indicator and first exciter ports, and having an optical waveguide extending between said first and second portions of said first optical bridge;
   a second optical bridge having first and second portions adapted to mate respectively with said second indicator and second exciter ports, and having an optical waveguide extending between said first and second portions of said second optical bridge;
   a switching key having first and second portions adapted to mate respectively with first and second corresponding portions of said optical switch, said first and second corresponding portions being optically coupled respectively to said first indicator and second exciter ports, said switching key having an optical waveguide extending between said first and second portions thereof;
   said method further comprising:
      mating said first and second portions of said first optical bridge with said first indicator and said first exciter ports prior to said signal generating step;
      mating said first and second portions of said second optical bridge with said second indicator and second exciter ports prior to said optical coupling step;
      removing said first optical bridge from mating contact with said first indicator and first exciter ports after said optical coupling step;
      said optical coupling step comprising mating said first and second portions of said switching key with said first and second corresponding portions of said optical switch to energize said second relay.

15. A method as in claim 13 wherein said method further comprises providing an optical switch having:
   a first indicator port optically coupled to said first relay for outputting light from said first light source, and a first exciter port optically coupled to said first relay for inputting light thereto;
   a second indicator port optically coupled to said second relay for outputting light from said second light source, and a second exciter port optically coupled to said second relay for inputting light thereto;
   an assembly rotatably mounted to said optical switch for coupling portions thereof;
   said coupling step comprising rotating said assembly from a first position in which only said first indicator and first exciter ports are optically coupled, to a second position in which all of said ports are optically coupled, then to a third position in which only said first indicator and second exciter ports are optically coupled.

16. A method according to claim 8 further comprising:
   providing an optical switch having an indicator port optically coupled to said first relay for outputting light from said first light source, and an exciter port optically coupled to said second relay for inputting light thereto;
   said optical switch including a switching key having first and second portions adapted to mate respectively with said indicator and exciter ports, and having an optical waveguide extending between said first and second portions; and
   said coupling step further comprising mating said first and second portions of said switching key with said indicator and exciter ports to energize said second relay.

17. A method as in claim 8 further comprising:
   providing an optical switch having an indicator port optically coupled to said first relay for outputting light from said first light source, and an exciter port optically coupled to said second relay for inputting light thereto;
   said optical switch including an assembly rotatably mounted thereon for coupling portions of said optical switch;
   said coupling step comprising rotating said assembly so as to optically couple said indicator and exciter ports, to energize said second relay.

* * * * *